United States Patent [19]
Stave

[11] 3,870,835

[45] Mar. 11, 1975

[54] STYLUS CONTROL APPARATUS FOR A VIDEO DISC RECORD PLAYER

[75] Inventor: Fredrick Roland Stave, Oaklandon, Ind.

[73] Assignee: RCA Corporation, New York, N.Y.

[22] Filed: Apr. 16, 1973

[21] Appl. No.: 351,600

[52] U.S. Cl. .......................... 179/100.4 R, 274/13 R

[51] Int. Cl. .......................... G11b 17/06, G11b 3/00

[58] Field of Search ...... 178/6.6 A, 6.6 DD, 6.6 FS; 179/100.4 R; 274/4 H, 11 E, 13 R, 15 R

[56] References Cited

UNITED STATES PATENTS

| | | | |
|---|---|---|---|
| 2,730,369 | 1/1956 | Steed | 274/13 R |
| 2,766,990 | 10/1956 | Balmer et al. | 274/13 R |
| 3,403,067 | 9/1968 | Aregger | 274/15 R |
| 3,622,163 | 11/1971 | Bachman | 274/13 R |
| 3,661,397 | 5/1972 | Worth et al. | 274/15 R |
| 3,783,196 | 1/1974 | Stanley | 179/100.1 B |

*Primary Examiner*—Stanley M. Urynowicz, Jr.
*Assistant Examiner*—Stewart Levy
*Attorney, Agent, or Firm*—Eugene M. Whitacre; J. B. Hayes; William H. Meagher

[57] ABSTRACT

A playback system has a rotatably driven turntable for controlling the operation of a playback stylus device with a video disc record disposed on the turntable. The video information, which is recorded in the form of geometric variations in a spiral groove of the record, is recovered by sensing the capacitance between the stylus playback device and the record surface. The stylus is supported in a housing which is movable in a manner to provide travel of the stylus radially over the record. A stylus control device provides movement of the stylus relative to the housing into and out of engagement with the record surface. Two drive arrangements are provided to be operable in alternative manner to drive the stylus housing over the record. A movable pointer is provided to indicate the position of the stylus along the record. Each of first and second drive means have motion coupling devices, which are controllably engageable in alternative manner to a driving shaft of the turntable. A movable drive change assembly is intercoupled with the respective drive arrangements and the stylus control apparatus, to selectively energize the drive and stylus control apparatuses.

The system includes a manual selector arm for positioning a portion of control mechanism, which is instrumental in establishing drive control of the stylus housing and positioning of the stylus. The selector positions one of a pair of electrical contacts in a given initial spaced relation. The second electrical contact is positioned by a portion of the drive means to cause the contacts to engage at a desired position of the stylus over the record. An electrical circuit completed thereby is operative through electro-mechanical means to control the drive and positioning of the stylus with respect to the record.

A manually actuatable lever arrangement is coupled to the drive and stylus control mechanism. This mechanism when actuated is operative to disengage drive of the stylus housing over the record and remove the stylus from the record, while maintaining the position of the stylus with respect to the center of the record.

12 Claims, 10 Drawing Figures

STYLUS CONTROL APPARATUS FOR A VIDEO DISC RECORD PLAYER

This invention relates to improved structure of a video disc playback system for providing desired positioning and controlled movement of a playback stylus device with respect to the record for recovering information recorded thereon.

One type of video disc reproducing system senses the capacitance between a stylus playback device and a disc record to reconstruct the video information. The stylus may include a thin conductive element or electrode riding in a groove of the record which is rotated at high speeds. In such systems, the video information is recorded in the form of geometric variations in a sprial groove on the surface of the disc record. The disc surface may include a conductive material covered with a thin coating of dielectric material. The stylus electrode cooperates with the conductive material and dielectric coating to form a capacitor. As the discc record is rotated, an edge of the conductive electrode, while riding in the disc groove, cooperates with the disc record to establish capacitive variations due to the geometrical variations in the spiral groove. The capacitor formed by the record and stylus may be coupled to a tuned circuit. Consequently, as the record is rotated, the resultant capacitive variations vary the resonant frequency of the tuned circuit. The tuned circuit may be energized by a fixed frequency oscillator, and thus, as the resonant frequency of the tuned circuit varies (due to geometrical variations in the spiral groove), the response of the tuned circuit to the excitation signal voltage changes as a function of the recorded information. This provides output signals which vary as a function of the recorded information.

When video signals which are recorded on such a disc are replayed, it is necessary to control the rotational velocity of the disc record. This prevents "jitter" of the displayed television picture, which results when velocity deviations occur and a conventional television receiver is employed to display the video signal. It is also necessary to provide accurate positioning and controlled movement of the playback stylus with respect to the rotating disc record. This is desirable not only to insure proper initiation and termination of playback information, but also to insure proper movement of the playback stylus for tracking the grooved record surface.

It is further desirable that various control functions including positioning and controlling the movement of the playback stylus device be provided in automatic manner. The automation of such player features eliminates the need for operator handling of the playback mechanism, thereby minimizing the chance of damage to the system. It also provides for reasonably precise and repeatable operation of the various playback mechanisms in synchronized manner. Such automation of the playback apparatus further permits the possibility of remote controlled operation, as well as allowing the mechanism to be enclosed during operation to prevent inadvertent operator injury or undesired radiation of signal energy.

In such systems, one problem is providing accurately timed and positioned control of the playback stylus device onto and away from the grooved disc record surface, as well as during playback. The record groove pitch may be for example 0.002 inches per second. This translates into a positional accuracy of 20 mils for a 10 second wait for video playback picture. Since the video disc records necessarily have a certain cutting tolerance, it is necessary for the playback stylus to land on the record within a 10 mil tolerance. The utilization of a purely mechanical trip and land system, such as used in audio phonograph players, is difficult due to such stringent landing requirements. It is therefore proposed to provide a system wherein player motions are controlled electrically. This enables the utilization of electrical sensing means with less force being utilized and consequently less wear.

There is also provided an arrangement that allows for altering the stylus landing or setdown position to any desired location on the record. Through the combination of disclosed electro-mechanical means, this is accomplished in a manner which provides desired accuracy and repeatability of positioning and control of the stylus playback device.

A further advantage of the disclosed arrangement is providing a drive motion arrangement for the playback stylus over the record, which is capable of providing precise movement of the stylus over the record yet is selectively energizable. In such playback systems a relatively large amount of torque, for example one to two ounces, must be transferred to the stylus arm assembly from the basic motive device such as the turntable. The disclosed drive arrangement provides accurate and rapid engagement and disengagement of the lateral drive of the stylus arm, with sufficient transmitted torque to prevent sporadic movement or binding of the stylus during tracking of the record.

In accordance with an arrangement embodying the invention, there is provided a playback system including a rotatably driven turntable for controlling the operation of a playback stylus device with a disc record disposed on the turntable. A stylus support housing is movably mounted to provide travel of the stylus radially over the record. Stylus control means provide movement of the stylus relative to the housing between a first position substantially co-planar with the record and a second position spaced from the first position. A first drive means is coupled to the housing and is selectively responsive to rotation of the turntable, for moving the housing between a standby position and a playback position. In an illustrative embodiment, this is accomplished by a rotary to translation mechanical movement disengageably coupled by rotational coupling members to the turntable. A second drive means is coupled to the housing and is selectively responsive to the rotation of the turntable for moving the housing during playback from the record. An embodiment of the second drive means includes biased retractable threaded jaws, whose engagement with a threaded drive shaft is controlled to transmit desired lateral torque for moving the stylus housing during playback. Means which intercouple with the first and second drive means and the stylus control means operate to selectively energize the drive means and stylus control means, so that the stylus is desirably positioned during operation of the respective drive means.

In accordance with another feature, mechanically setable means, intercoupled with the first drive means, are provided for varying, through electro-mechanical means, the position of the stylus on the record at which information playback begins.

A further feature provides manually actuatable interruption of movement of the playback stylus over the record, while maintaining stylus position, to thereby accomplish selective temporary discontinuance of playback from the record.

A complete understanding of the invention can be obtained from the following description thereof when taken in conjunction with the accompanying drawings, in which.

Figure 1:
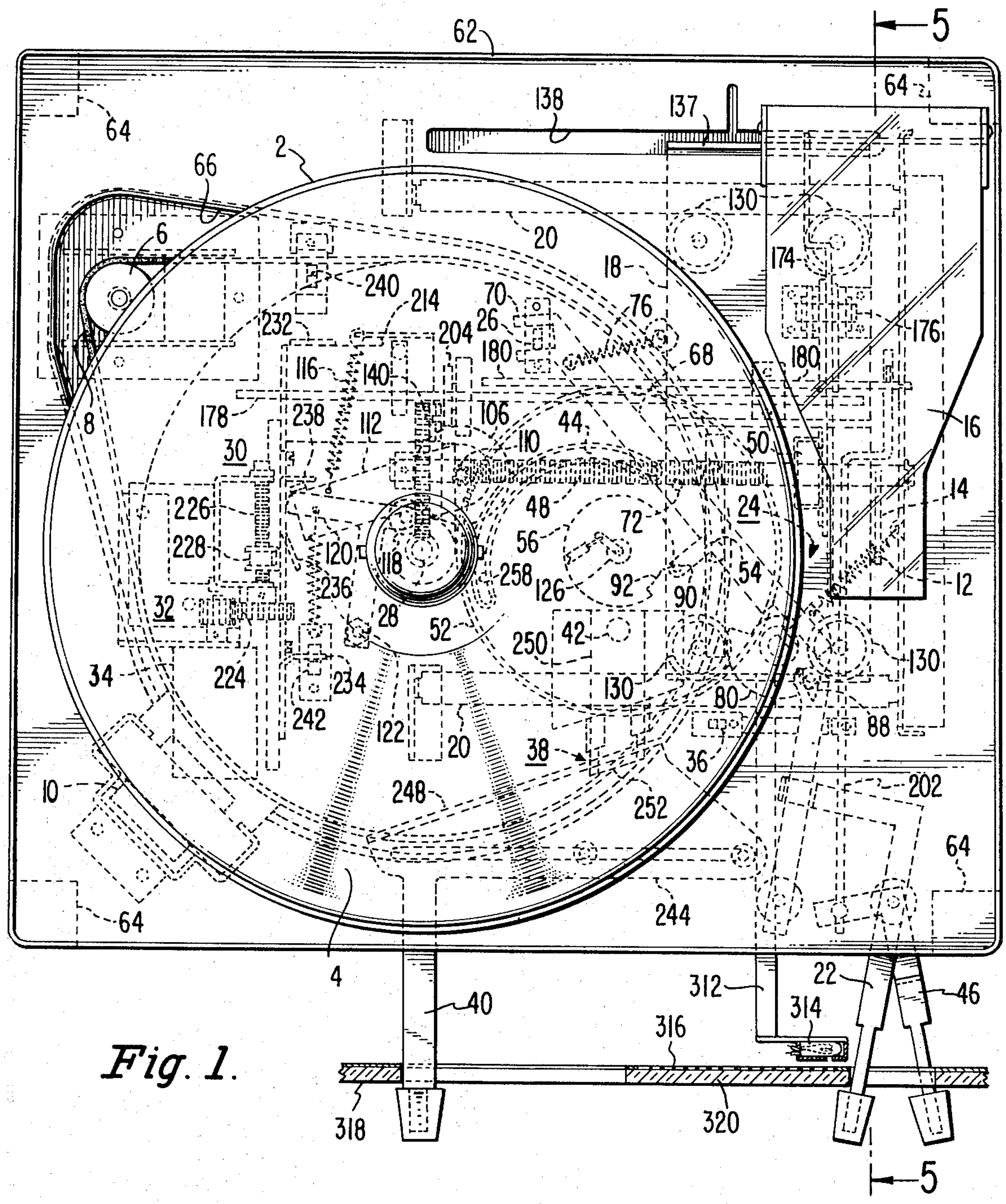
FIG. 1 is a top plan view of a disc record playback system illustrating the principles of the invention.
Figure 9:
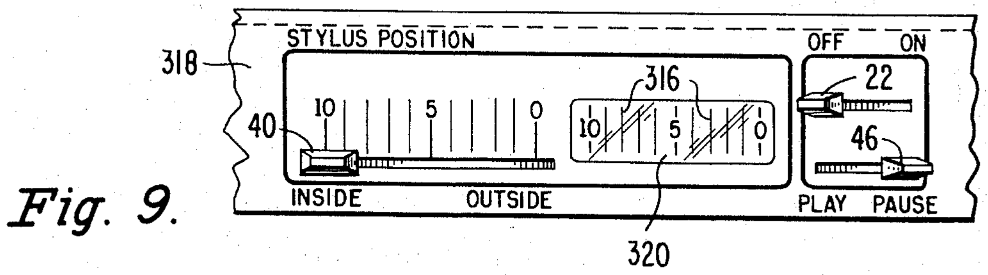
FIG. 9 is an elevation view of the front panel of the playback system as shown in FIG. 1.

For ease in understanding the more detailed description, reference is first made to a general overall description of the disclosed playback system.

As shown in the various figures, the playback system includes a turntable 2 which supports and rotates a video disc record 4. The turntable 2 may be driven by a synchronous motor 6 coupled to the turntable by means of a belt drive 8. The motor may be caused to rotate the turntable at a speed above a desired speed, with an eddy current brake 10 used to establish the final desired speed of the turntable.

The playback stylus 12, which cooperates with a major surface of the record 4, is disposed at an end of an arm 14 which is mounted in a movable housing 16. The arm is hinged or pivoted by means such as the tapered pin 15 in aperture 17, to permit vertical movement of the stylus 12 toward and away from the record surface 4. The housing 16 is mounted on a carriage 18 which moves along a set of rails 20, to provide movement of the stylus 12 over the record 4 along a radial path with respect to the center of the record. Movement of the carriage 18 is in a plane parallel to the disc surface 4. However, the stylus arm 14 mounting includes means for disposing the stylus in one of two positions with respect to the plane of the record (see in particular FIGS. 3 and 4). In one position, the stylus 12 is elevated in spaced relation with the plane of the record 4, while the stylus in a second position assumes a position substantially co-planar with the disc record.

The synchronous motor 6 which supplies drive for the turntable 2 also provides the basic motive force for controlling the positioning of the carriage 18 and the stylus 12 with respect to the record 4. The motor 6 is energized by a mechanical control 22 which is coupled through a latchable lever system 24 which operates an energizing power switch 26.

The drive for positioning and moving the stylus 12 and housing 16 with respect to the record 4 is provided by a central shaft 28 coupled to and rotated by the turntable 2. Two distinct drive arrangements are utilized for positioning and driving the carriage 18 and stylus housing 16 with respect to the record 4. The first, hereinafter referred to as the cycling drive, is utilized to control the positioning of the housing 16 and stylus 12 before and following playback of information from the disc record 4. The second drive, hereinafter referred to as the play drive, is utilized to control movement of the housing 16 and stylus 12 over the record during playback of information from the record 4.

Figure 10:
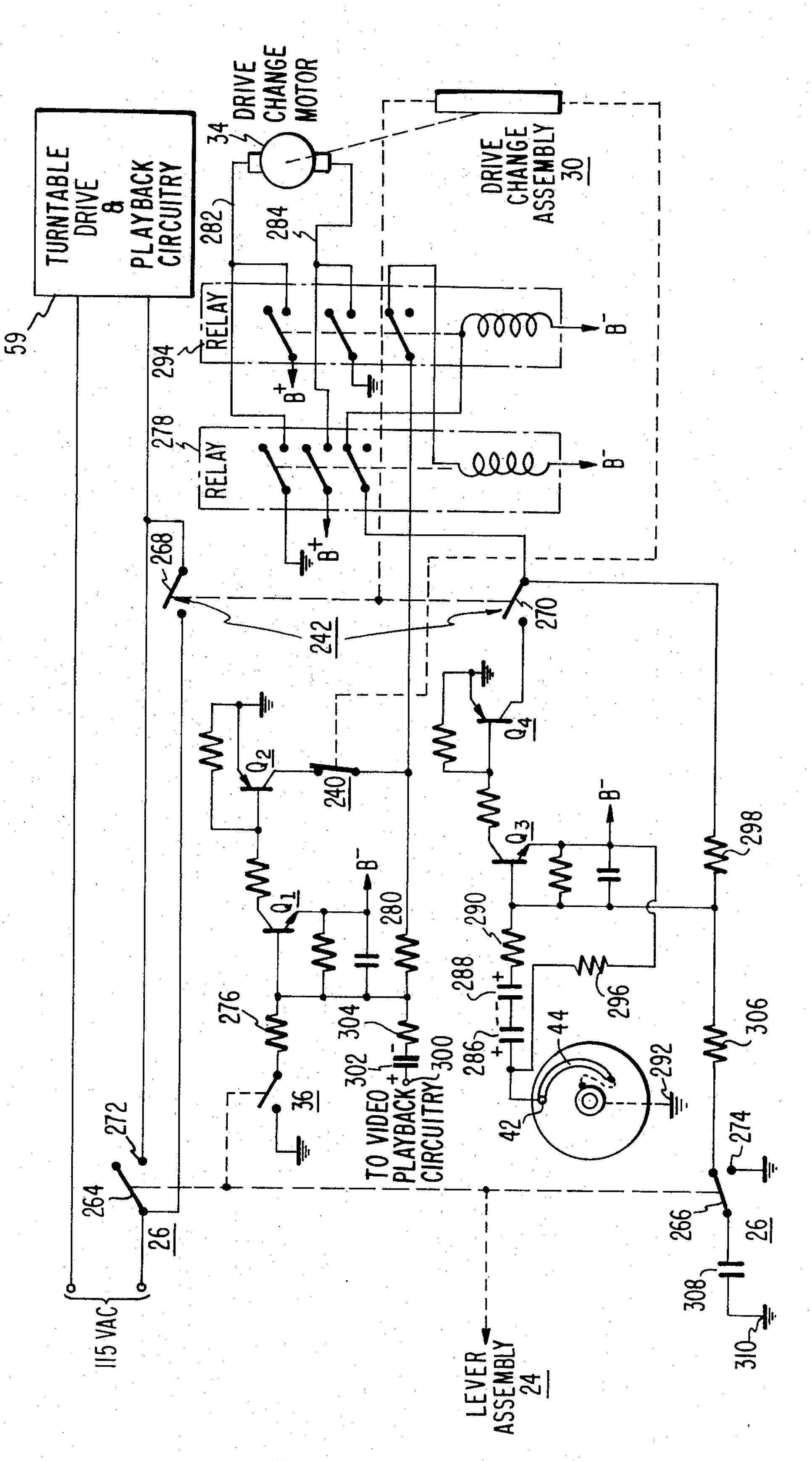
FIG. 10 illustrates diagrammatically and schematically an embodiment of electrical apparatus utilized in operating the playback mechanisms.

Since each of the drive mechanisms is selectively operable to provide movement of the carriage 18 and housing 16, a drive change assembly 30 is provided which is movable in a manner to determine which of the two drive arrangements will be effective in moving the carriage 18 and housing 16 assembly. In addition, the positioning of the movable drive change assembly 30 is effective in determining the position of the stylus 12 with respect to the record 4. The mechanical positioning of the movable drive change assembly 30 is determined by an electro-mechanical arrangement 32, including a further motive means such as a DC drive motor 34 or solenoid. The DC drive motor 34 is energized and controlled by circuitry including relays and switching devices, as shown in FIG. 10, which are mounted to be controlled by the position of the movable drive change assembly 30.

Figure 2:
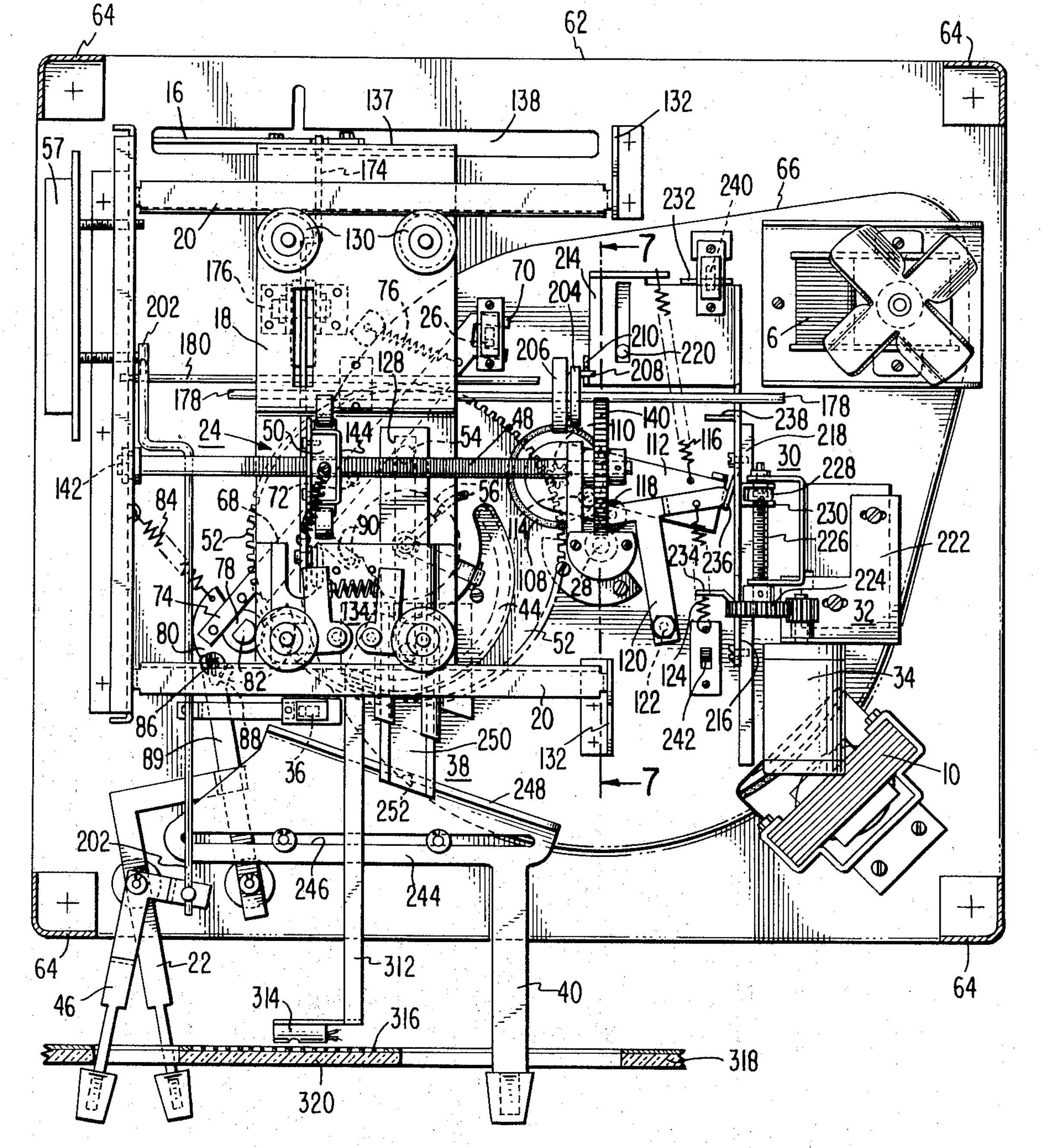
FIG. 2 is a bottom plan view of the playback system of FIG. 1.

Initial travel of the movable drive change assembly 30 from a rest or standby position as shown in FIG. 1, to a position which enables the cycling drive as shown in FIG. 2, is provided by a switch 36 which is operated through the actuation of the control lever 22. Switchover from the cycling drive to the play drive means is accomplished by a further movement of movable drive change assembly 30, which is in response to reversal and further energization of the DC motor 34. The time of occurrence of this reversed drive is controlled by the electro-mechanical arrangement 32 which also determines the setdown position of the stylus 12 with respect to the record 4. The stylus setdown control mechanism 38 includes a selector arm 40 which is movably positionable by an operator. The position of the selector 40 positions one 42 of a pair of electrical contacts in a given relative spaced relation. The second electrical contact 44 is movable in response to the cycling drive mechanism, so as to cause the first and second electrical contacts 42,44 to be moved into engaging relation, to thereby complete an electrical circuit to the DC drive motor 34. Thus, the amount of time the cycling drive is effective in moving the carriage 18 and housing assembly 16, in searching out the position for initiating playback of the record 4, is controlled by the initial relative spacing of the contacts selected by the stylus setdown control mechanism 38.

Movement of the movable drive change assembly 30 in response to the DC motor 34 is also effective in positioning the stylus 12 with respect to the plane of the record 4. It will be understood that the mechanism is arranged such that, when the cycling drive is effective in moving the carriage 18 and stylus housing assembly 16, the stylus 12 is retracted or in a position spaced from the plane of the record 4. However, when the play drive mechanism is effective in moving the carriage 18 and stylus housing assembly 16, the movable drive change assembly 30 is positioned to permit the stylus 12 to be disposed in the plane of the record 4.

There is also provided in the system an operator-actuated pause lever control 46, which is effective to interrupt the play drive to the stylus housing assembly 16 and at the same time dispose the stylus 12 in a retracted position above the record 4.

The play drive apparatus generally comprises a threaded rod or worm 48, which is permanently geared for rotation from the driven turntable shaft 28. The carriage 18 includes a set of retractable jaw-like members 50 which surround the threaded rod 48. The retractable jaws 50, which are controlled from the movable drive change assembly 30, are effective to provide selective engagement with the threaded rod 48 to thereby provide lateral movement of the carriage 18 and stylus housing assembly 16.

The cycling drive basically comprises a relatively large gearwheel 52 which is selectively engageable, through friction and gearing means, with rotatably driven turntable shaft 28. Coupling of the cycling drive gearwheel 52 to the turntable shaft 28 is controlled in accordance with the position of the movable drive change assembly 30. The gearwheel 52 is permanently coupled 54 to the stylus housing carriage 18 to provide coordinated movement of the carriage 18 and gearwheel 52. During cycling of the stylus 12 onto and off of the record 4, the gearwheel 52 is rotatably driven to thereby position through the coupling 54 the stylus housing assembly 16 with respect to the record 4. During playback, when the play drive arrangement is effective in driving the stylus housing carriage 18, the gearwheel 52 is disabled as a driving member. However, the gearwheel 52 remains coupled to the stylus carriage assembly 18 with its rotational position determined by the position of the carriage assembly 18.

The gearwheel 52 of the cycling drive carries the second movable electrical contact 44 which is instrumental in determining the point of drive mode initiation for the stylus housing carriage 18 and setdown of the stylus 12.

The gearwheel 52 further includes an annular cam 56, which cooperates with the on-off control lever arrangement 24 to provide latching and unlatching control of electrical energy utilized in powering the playback system.

Suitable electrical means 57 including switching, circuitry and relay devices, whose arrangement and operation will hereinafter be described in detail with respect to FIG. 10, are utilized to provide desired intercoupling and control of the various mechanical apparatus in accordance with the operator control levers of the playback system.

The playback system also includes appropriate playback circuitry 59, as indicated diagrammatically in FIG. 10, for recovering and processing signal information from the record 4.

Reference is now made to a more detailed description taken in conjunction with the figures, in which like reference characters designate the same elements in the various views.

The player mechanisms are disposed within an enclosure 58 which includes a hinged lid 60. The playback mechanisms are coupled to and supported by a base member 62, which is secured to the enclosure by a series of support brackets 64. The baseboard 62 may be formed of a stamped metal and includes a depressed portion 66, which encloses the underside of the turntable 2 and through which the turntable shaft 28 is mounted.

The synchronous motor 6 is coupled by suitable leads, not shown, to a first set of contacts of a normally open power switch 26, which is secured to the baseboard portion 66 by suitable fastening means. The switch 26 is coupled to the on-off control 22 through the lever system assembly 24. The lever system assembly 24 comprises a first arm 68 having a forked end 70 bracketing the slidable actuator for the switch 26. The arm is pivotal about a pin 72 and has a flatted portion 74 at its opposite end. The arm 68 is biased in a rest position by means of a spring member 76.

The flatted portion of arm 74 is disposed in contacting relation with a flatted portion 78 of a sleeve member 80 which is rotatably mounted about a shaft 82. The sleeve member 80 is disposed in its rest position, as shown in FIG. 2, by a spring member 84. The sleeve member 80 carries a pin 86 which is engaged by the forked end 88 of a rod 89 coupled to the on-off lever 22. The arm 68 also includes a protrusion to which is mounted a pin 90, which comprises a cam follower for cooperating with the cammed surface 56 on the gearwheel 52. Movement of the lever 22 causes a rotation of the sleeve member 80 against the spring member 76. The sleeve causes the arm 68 to pivot about the pin 72, thereby moving the forked end 70, which turns on the power switch 26. Binding action between the sleeve 80 and the flatted arm portion 74 maintains the arm 68 in that position until the cam follower pin 90 is engaged by the cam surface 56 of the gearwheel 52. Engagement of the pin 90 by the cammed surface 56 causes further pivoting of the arm 68, which provides a clearance to allow return of the sleeve 80 by the spring 84. The arm 68 is, however, maintained in this latched position by the cam follower pin 90 cooperating with the cammed surface 56. This latched condition of the power switch 26 is maintained until the gearwheel 52 again positions the detented portion 92 opposite the cam follower pin 90. In that position, the pin 90 enters the detent 92, allowing the arm 68 to return to its initial rest position under the influence of spring member 76.

Figure 7:
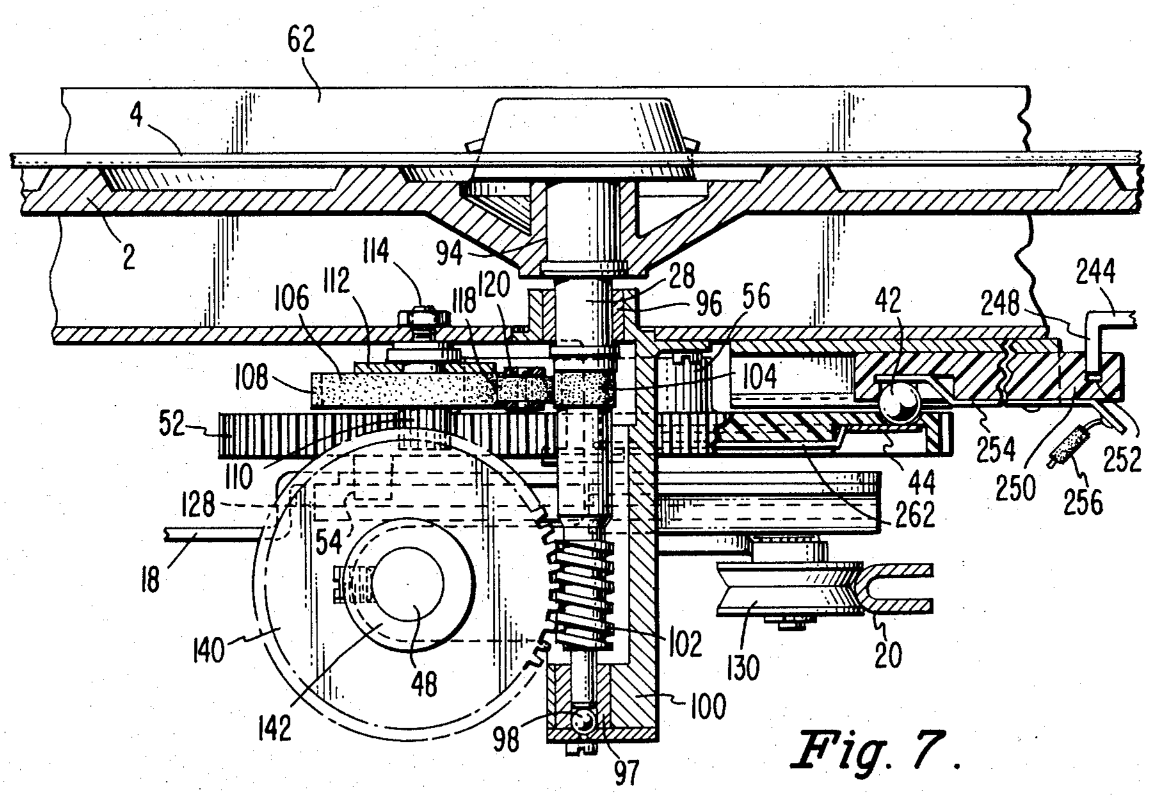
FIG. 7 is a sectioned view along line 7—7 of FIG. 2, showing rotational motion coupling from the turntable shaft to the cycling and playback drive assemblies.

As previously indicated, the turntable 2 is rotatably driven by a belt drive 8 which surrounds the turntable 2 and is coupled to the synchronous motor 6. The shaft 28 is secured to the turntable 2 for rotation therewith, by means of an aperture 94 which receives one end of the shaft 28. As shown particularly by FIG. 7, the shaft 28, which is disposed through bearings 96 and 97 for rotation on a further bearing 98, is coupled to the member 66 by a sleeve-like member 100. The shaft 28 includes a worm gear portion 102 and a high-friction annular surface 104, both of which facilitate transmission of rotary power to mechanisms which will hereinafter be described. A circular rotary motion transmitting device 106 has a friction drive peripheral surface 108 and a smaller diameter coaxial geared surface 110. The device 106 is secured to a bracket 112 which is pivotally mounted to the member 66 by means of a pivot pin 114. The bracket 112 is biased by means of a spring 116 to cause the geared surface 110 of the member 106 to be in engagement with the geared peripheral surface of the gearwheel 52. The frictional surface 108 of the circular member 106 is selectively coupled to the friction surface 104 of the shaft 28 by means of a friction idler wheel 118 interposed therebetween. The idler wheel 118 is carried on a bracket 120 which is also pivotally mounted to the member 66 by means of a pin 122. The idler wheel bracket 120 is biased by means of a spring 124 to be normally positioned out of engagement with the friction surface 108 of the member 106 and the shaft 28.

The gearwheel 52 is rotatably mounted on a shaft 126, which is secured by suitable means to the member 66, in a manner to dispose the gearwheel 52 for cooperation with the geared surface 110 of member 106. Secured to one side of the gearwheel 52 is a pin member 54, which is disposed for captive engagement by a slot 128 on the carriage 18 for coupling movement thereto. The carriage 18 comprises a generally L-shaped member formed of sheet metal or other similar material. A set of four rotatably mounted pulleys 130 are secured to the carriage 18. The pulleys 130 engage a pair of spaced rails 20 which are secured by brackets 132 coupled to the baseboard member 62. The pulleys 130 are maintained in engagement with the rails by means of a tensioning device 134, which includes a pair of L-shaped pivotable member intercoupled by a spring.

The housing 16 for the arm 14 and stylus 12 is secured to and supported by the upright portion 137 of the L-shaped carriage 18, which passes through an elongated slot 138 in the baseboard member 62. The stylus housing assembly 16 is mounted to the carriage 18 in a manner which produces radial movement of the stylus with respect to the record 4 in response to driving of the carriage 18 along the rails 20.

A gear element 140, which is permanently coupled to the worm gear 102 portion of shaft 28, is secured by means of a set screw at one end of threaded rod 48. The threaded rod 48 is rotatably mounted to be disposed between and in a direction parallel to the rails 20. Low friction bushings or bearings 142, secured to brackets coupled to the baseboard member 62, are utilized for rotatably mounting the threaded rod 48.

Situated on the underside of the carriage 18 and secured thereto is a generally U-shaped sheet metal bracket 144 for mounting a pair of slidably movable retractable jaws 50. As best viewed in FIG. 6, each of the jaws 50 is generally rectangular in shape and has a semicircular threaded cutout 146 along one edge thereof which complements the threading of rod 48. The jaws 50 are biased into mutual engagement with the semicircular cutouts disposed about the threaded rod 48, by means of a pair of circular spring members 148. The jaws 50 have corresponding inclined surfaces which cooperate to provide a V-shaped or constricted slot 150 between the jaws. Disposed in the V-shaped slots 150 are a pair of pins 152 carried by a bracket 154, which is disposed for slidable movement in the direction of arrow 156 by a pair of pin and slot members 158. In response to the movement of the bracket 154, the pin members 152 move against the V-shaped slots 150 of the jaws, thereby forcing the jaws 50 apart to dispose the semicircular threaded portions 146 in spaced relation to the threaded rod 48. Movement of the bracket 154 is accomplished by a further bracket 160 having a slot 162 engaged by a pin 164 on the bracket 154. The bracket 160 is pivotally mounted about a pin 166 and biased into the position shown in FIG. 6 by means of a spring 168 coupled thereto to one side of the pivot pin 166. A portion 170 of the bracket 160, disposed to the other side of the pivot 166, is pinned to one end 172 of an elongated arm 174. The elongated arm 174 is pivoted about a pin 176 which is secured to the carriage 18.

First 178 and second 180 D-shaped rods are disposed to contact one edge of the elongated arm 174. Rotation of either of the D-shaped rods, the control of which will hereinafter be described, causes a clockwise rotation of the arm 174 about the pivot 176, as viewed in FIG. 6. This rotation causes the arm end 172 to travel in an upward direction, as viewed in FIG. 6. Such movement causes the bracket 160 to rotate in a clockwise direction about the pin 166. This pivotal movement coupled through the pin 164 and slot 162 provides movement of the bracket 154, thereby providing controlled positioning of the jaws 50 with respect to the threaded rod 48.

Figure 3:
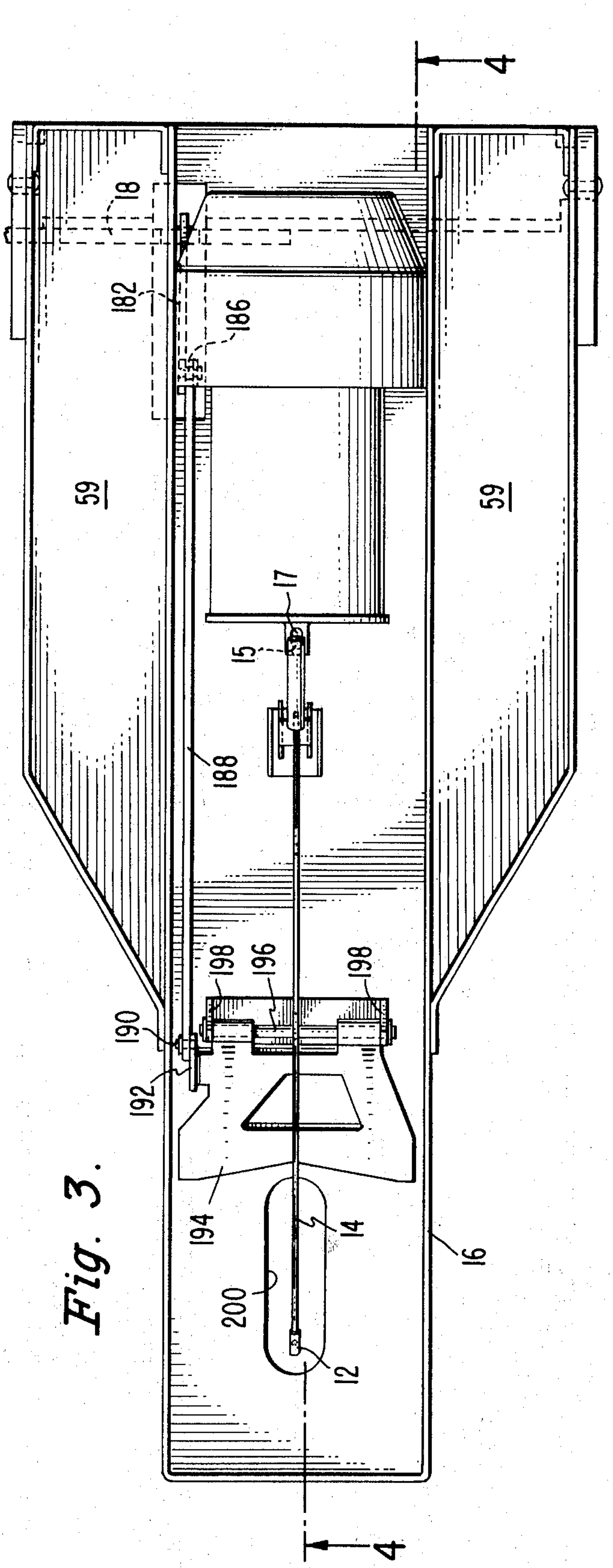
FIG. 3 is a top plan view of the movable housing and stylus arm assembly portion of FIGS. 1 and 2 with the cover removed.
Figure 4:
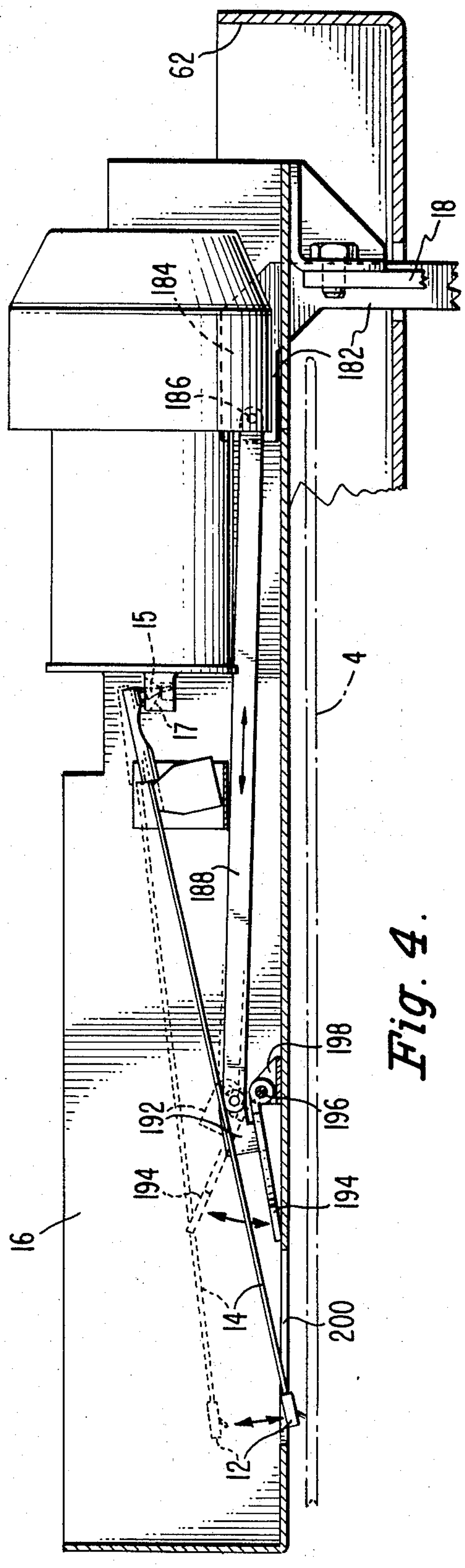
FIG. 4 is a cross-section taken substantially along line 4—4 of FIG. 3.
Figure 5:
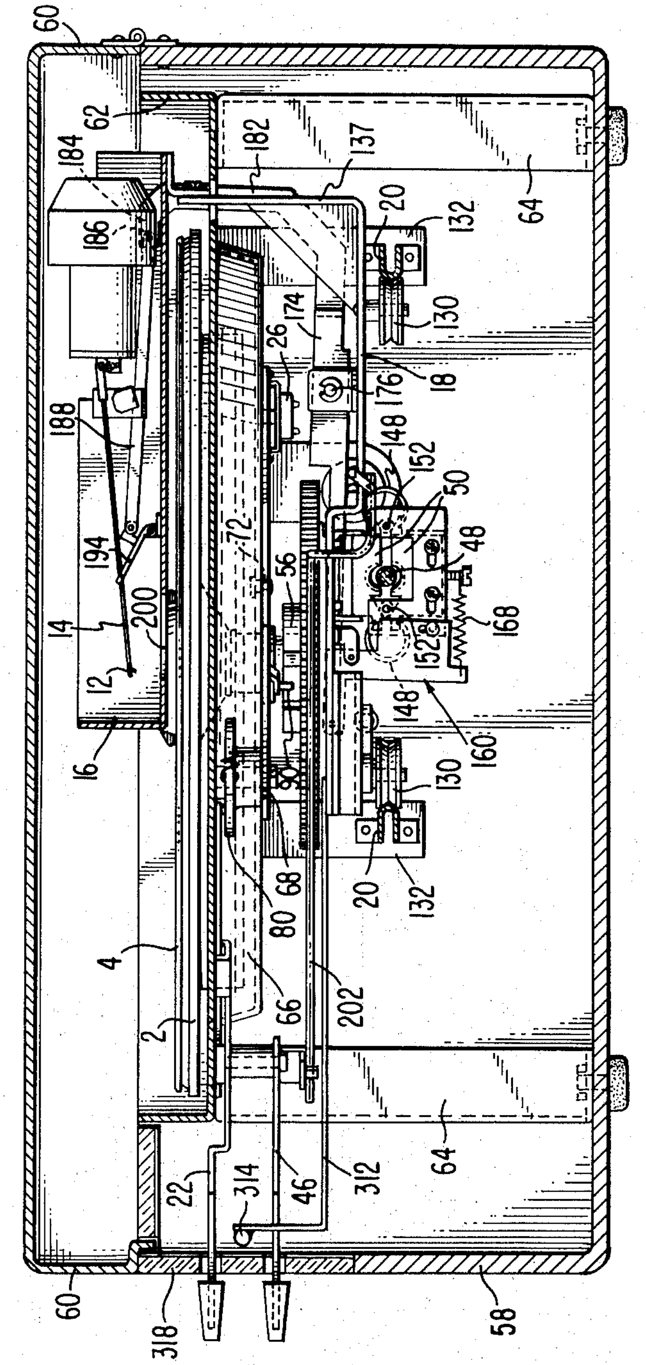
FIG. 5 is a side section along line 5—5 of FIG. 1, illustrating details of the position and control assembly for the movable stylus arm housing shown in the previous figures.

To the other side of the pivot 176 the elongated arm 174 is provided with a U-shaped portion 182, which passes through the opening 138 in the baseboard member 62 and extends into the stylus arm housing 16. The end 184 of the U-shaped portion of the elongated arm 174 is coupled, by means of a pin 186, to a further arm 188 disposed along the lower portion of the stylus housing assembly 16. As best shown in FIGS. 3 and 4, the arm 188 is coupled by a pin 190 to a tab 192 secured to a generally planar member 194 having the general shape shown in FIG. 3. The member 194 is pivotally secured to the bottom portion of the housing 16 by means of a pin 196 passing through a pair of upright portions 198 of the member 194. As shown in FIG. 3, the member 194 extends across the housing 16 and is situated beneath the stylus arm 14, at a point proximate to the point at which the stylus arm 14 passes through an aperture 200 in the housing 16 for contacting the record 4.

Figure 6:
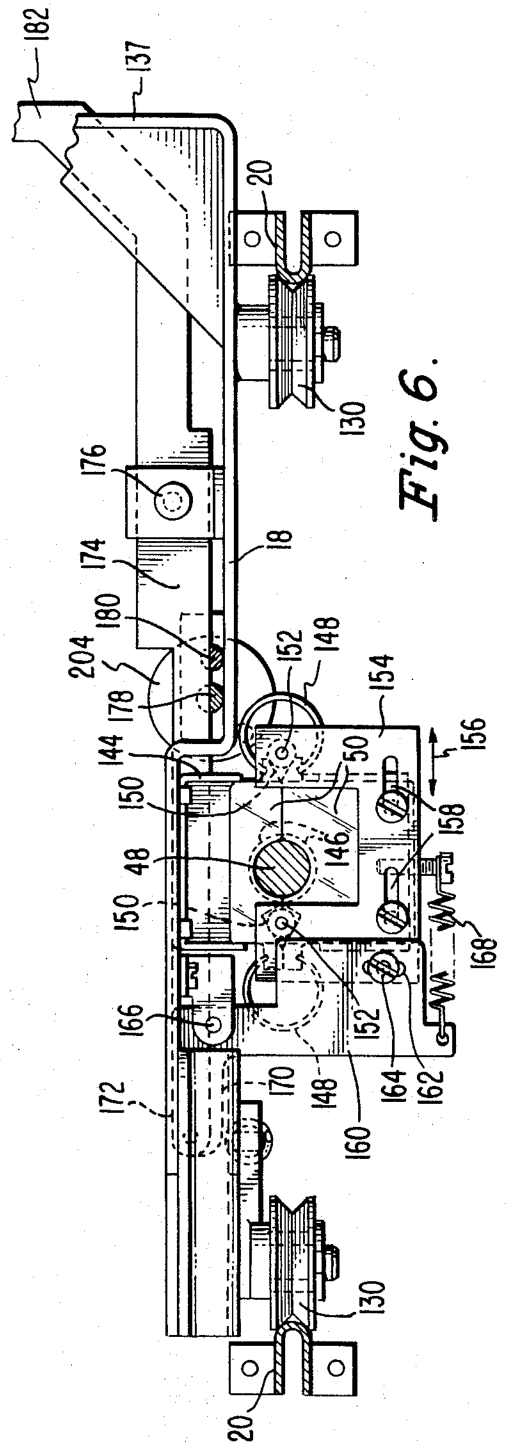
FIG. 6 is an enlarged side elevation view of a portion of the arrangement of FIG. 5.

As shown in FIG. 4 in solid lines, the member 194 in one position is spaced from the stylus arm 14. However, the clockwise movement of the U-shaped portion 182 of the elongated arm 174, as previously described, in response to rotation of one of the D-rods 178,180 as shown in FIG. 6, causes corresponding movement of arm 188 in a direction to the right as viewed in FIG. 4. This movement of arm 188 causes a rotation of the member 194 about pin 196. This rotation of the member 194 causes it to assume the position as depicted by the dash lines in FIG. 4. As shown, when the member 194 assumes its dashed line position, the stylus arm 14 is contacted and caused to be elevated. The elevation of the stylus arm 14, thus produced by member 194, causes the stylus 12 to be rotated in an upward direction through the aperture 200 and into the stylus housing assembly 16, thereby removing the stylus 12 from the plane of the record 4.

Reference is now made to control of the D-shaped rods 178 and 180, which actuate the elongated arm 174, thereby controlling the positioning of the movable jaws 50, and positioning of the stylus 12.

The D-shaped rod 180, which extends in parallel fashion to the rails 20, is secured to one end of a connecting rod 202. The opposite end of the connecting rod 202 is coupled to the puase control lever 46. Movement of the pause control lever 46 causes rotational motion of the D-rod 180 through a longitudinal movement of the connecting rod 202. The pause control lever 46 is thus effective through the D-rod 180 in actuating the elongated arm 174, which lifts the stylus away from the record and at the same time removes the threaded jaws 50 from the rod 48, thereby terminating lateral movement of the carriage 18 by the rod 48.

As best viewed in FIG. 2, the further D-shaped rod 178 is mounted through a central aperture in a circular disc 204. The disc 204 is rotatably mounted in a support member 206 which is fastened by suitable means to the member 66. A pin 208 is secured to one side of the rotatable disc 204. The pin is mounted to the disc in an off-center position, to thereby provide rotation of the D-rod 178 in response to the rotation of the disc 204 by the pin 208. The pin 208 is engaged by a slot 210 carried by a movable sheet metal bracket 214, which forms a portion of the drive change assembly 30. The bracket 214 has a pair of further slots 216 therein, for slidably mounting by means of screw members to a block 218 which is coupled to the member 66. The bracket assembly mounting is such as to provide lateral movement of the bracket 214 in a direction substantially perpendicular to the direction of extent of the rails 20. A pin 220 engaged by a slot in the bracket 214 is provided to further guide the lateral movement of the bracket 214. The lateral movement of the bracket 214 causes the slot 210 engaged with pin 208 to rotate the circular disc 204 through an approximate 90° rotation. This rotation of the disc 204 causes rotation of the D-shaped rod 178, thereby controlling the pivotal position of the elongated arm 174.

Slidable movement of the bracket 214 is provided by an electro-mechanical assembly 32. The assembly 32 includes a drive source such as DC motor 34, which is secured to a support 222 fastened by means such as screws to the member 66. The motor 34 shaft is coupled through gearing 224 to a worm gear shaft 226, which is also supported from the member 66. Disposed about the worm shaft 226 is a threaded follower 228, which is driven along the worm shaft in response to rotation of the worm shaft 226. A U-shaped coupling 230 secured to the movable bracket 214 is disposed about the follower 228, to impart lateral motion to the bracket 214 as the worm shaft 226 is rotated.

Carried by the movable bracket 214 are a series of protruding finger-like members 232,234,236,238. The protrusions 232 and 234 disposed at the end portion of the bracket 214 are disposed to be engaged with and disengaged from switches 240 and 242, respectively, in response to the positioning of the movable bracket 214. The switches 240 and 242, which are secured by means such as screws to the member 66, are instrumental in controlling the energization of the DC drive motor 34, as hereinafter more fully described. The protrusions 236 and 238, in response to the positioning of the movable bracket 214, are instrumental in controlling the coupling of movement between the turntable shaft and gearwheel 52. The movable bracket 214, when positioned as shown in FIG. 2, causes the finger 236 to engage an end of the member 120. The positioning of the finger 236 by the movable bracket 214 causes the member 120 to be pivoted against the action of spring 124, bringing the idler wheel 118 into engagement with the turntable shaft 28. For the position of the movable bracket 214, as shown in FIG. 2, the finger 238 is spaced from the pivotal member 112. The spring member 116 therefore positions the peripheral frictional surface 108 of the member 106 in contact with the idler wheel 118 and disposes the geared surface 110 of the member 106 in engagement with the geared periphery of the wheel 52. Thus, for this position of the movable bracket 214, rotational drive is coupled from the turntable shaft 28, through the idler wheel 118 and member 106 to rotate the gearwheel 52. Rotation of the gearwheel 52 is coupled through the pin 54 in the slot 128 of the carriage 18, to thereby provide controlled motion of the carriage 18 along the rails 20.

The DC motor 34, which is reversible, may be energized to dispose the movable bracket 214 in the position shown in FIG. 1. For the position shown in FIG. 1, the finger 236 is spaced from the member 120 carrying the idler wheel 118. The idler wheel 118 is therefore moved out of engagement with the turntable shaft 28 by means of the spring 124. At the same time, the finger 238 is in engagement with the pivotal member 112 which carries the member 106. In FIG. 1, the finger 238 is positioned such as to cause the member 112 to move against the action of spring 116, thereby disengaging the geared surface 110 of member 106 from the gearwheel 52. For this condition, drive of the carriage 18 through the gearwheel 52 is disengaged by virtue of the interruption of the coupling between the gearwheel 52 and the turntable shaft 28.

The disclosed arrangement also includes a stylus setdown control mechanism 38. This mechanism is instrumental in determining the initial point of setdown of the stylus 12 on the record 4. The setdown mechanism 38 is also instrumental, as herein described, in providing control of the initial changeover of the drive of the carriage 18 from the gearwheel 52 of the cycling drive, to the jaws 50 and threaded rod 48 of the playback drive assembly. The setdown control mechanism 38 includes a slotted bracket 244 having a portion forming the control arm 40. The bracket 244 is slidably mounted by pins secured to the baseboard member 62 which pass through the slot 246. The bracket 244 includes a ramp-shaped portion 248. A member 250 carrying a ball-shaped electrical contact 42 is slidably mounted to the baseboard member 62, for movement toward and away from the center of the gearwheel 52. The member 250 is coupled to the bracket 244 by means of a slot 252 in the member 250, which engages the ramp portion 248 of the bracket 244. Electrical coupling to the ball-shaped contact is provided by a conductive tab 254 intercoupling the ball 42 with a conductive lead 256. The member 250 is arranged to dispose the ball-shaped contact 42 in contacting relation with one surface of the gearwheel 52.

Figure 8:
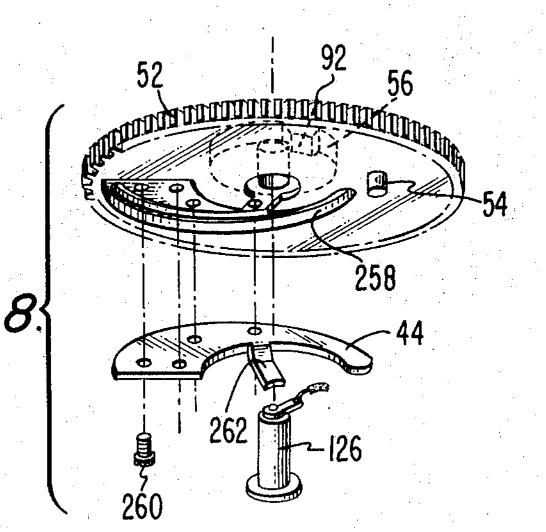
FIG. 8 is a disassembled perspective view illustrating details of a portion of the cycling drive assembly shown in FIG. 7.

As shown in FIG. 8, the gearwheel 52 has a spirally extending aperture 258 therethrough. Secured in the aperture 258 by means such as screws 260 is an electrically conductive contact plate 44. The contact plate 44 has a centrally protruding conductive member 262 which contacts a conductive mounting shaft 126 for the gearwheel 52. Electrical connection to the contact 44 is provided by a lead coupled to shaft 126.

The ball-shaped contact 42 is dimensioned to enter the aperture 258 and provide engagement with the contact 44. Since the aperture 258 in the gearwheel 52 is spirally shaped, the amount of rotation in the gearwheel 52 necessary to cause engagement of the contacts 42 and 44 is dependent upon the position of the ball 42 with respect to the center of wheel 52. The positioning of the member 250 is determined by the manual setting of the control arm 40 of the setdown control mechanism 38.

Operation of the playback system will now be discussed in conjunction with the figures, including FIG. 10 which shows electrical control circuitry for the mechanical playback mechanisms.

FIG. 10 shows the disposition of an embodiment of electrical control circuitry for the player mechanisms, in a condition where the player system is off prior to operation. In this condition the contact arms 264 and 266 of power switch 26 are as shown in FIG. 10. The contact arms for the limit switches 240 and 242 are arranged to be in a normally electrically closed condition by means, such as an internal or external spring or other suitable means, not shown. For the initial off position of the playback mechanism, the drive change assembly 30 is disposed in the position in FIG. 1. In this position, the finger 232 is spaced from the limit switch 240, thereby rendering the switch 240 in its normally closed position, as shown in FIG. 10. However, the finger 234 contacts the limit switch 242, thereby disposing the contact arms 268 and 270 in the position shown in FIG. 10.

To commence operation of the playback system the on-off lever 22 is actuated by movement to the right as viewed in FIG. 1. Two events take place as a result of the movement of the control lever 22. The arms 264,266 of the power switch 26, through the action of the latched on-off lever assembly 24, are disposed to engage contacts 272 and 274, respectively. This provides, through arm 264, AC power to the entire system and thereby energizes the various DC power supplies. Movement of the control lever 22 also causes the normally open start-reject switch 36 to be momentarily closed by the temporary contact therewith by arm 89. Closure of the switch 36 causes ground to be coupled through resistor 276 to the base of transistor $Q_1$. Transistor $Q_1$ thus turns on, which also causes the transistor $Q_2$ to turn on. The limit switch 240, being in its normally closed position, and with transistor $Q_2$ conducting, ground is connected to the coil of relay 278 which energizes it. At the same time, conduction of the transistor $Q_2$ is fed back through resistor 280 to the base of transistor $Q_1$. This enables the transistor $Q_1$ to be latched up or maintained in a conductive state even when the start-reject switch 36 is reopened. With the relay 278 energized, voltage is applied to the DC motor with ground on lead 282 and B+ on lead 284. This causes the DC motor to move the drive change assembly 30 to a position, as shown in FIG. 2, which will cause the cycle drive mechanism to operate. That is, the bracket 214 of the drive change assembly 30 is moved from the position shown in FIG. 1 to that shown in FIG. 2. This movement allows the fingers 236 and 238 to cause a coupling of rotational motion from the turntable shaft 28 through the idler wheel 118 and member 106 to the gearwheel 52. Rotation of the gearwheel 52 through the pin 54 causes the carriage 18 to move along the rails 20. At the same time, the movement of the bracket 214 to the position of FIG. 2, causes the rotation of the D-rod 178 which through the coupling of arms 174 and 188 disposes the stylus arm 14 in its retracted position. The bracket 214, however, being positioned as shown in FIG. 2, causes the limit switch 240 to open. This unlatches the electrical circuit of transistors $Q_1$ and $Q_2$ and also causes the relay 278 to be de-energized, thereby stopping the motion of the DC motor 34.

At this time, the stylus arm housing 16 is now cycling over the record 4 in search of its proper starting position on the record 4. The starting position for playback on the record is determined by the preselected position of member 250, with respect to the center of the gearwheel 52, by the lever 40. The positioning of the ball contact 42 determines the amount of rotation of the gearwheel 52 necessary to cause the ball contact 42 to engage the ground contact 44 in the aperture 258 of the gearwheel 52. Engagement of the contacts 42 and 44 causes the base of transistor $Q_3$ to be temporarily coupled through capacitors 286 and 288 and resistor 290 to a ground 292, thereby turning on transistor $Q_3$. The turn-on of the transistor $Q_3$ causes transistor $Q_4$ to also be turned on and energizing relay 294, since the limit switch 242 is now in its normally closed position, as shown in FIG. 2. Upon subsequent rotation of the gearwheel 52, which separates the contacts 42 and 44, the capacitors 286 and 288 are discharged through resistor 296. With the limit switch 242 closed, the conduction of $Q_4$ causes conduction through resistor 298 back to the base of transistor $Q_3$. This establishes a latched-up condition for the transistors $Q_3$ and $Q_4$. The energization of relay 294 causes a voltage to be applied to the DC motor 34 in which B+ is applied to lead 282 and ground to lead 284. This provides energization to the DC motor 34 in a reversed sense, to drive the bracket 214 of change assembly 30 from the position shown in FIG. 2 back to its original position, as shown in FIG. 1.

As the drive motor 34 moves the bracket 214 away from the cycle drive position shown in FIG. 2, the fingers 236 and 238 cause disengagement of the coupling between the gearwheel 52 and the turntable shaft 28. This stops lateral drive of the carriage 18 by the gearwheel 52. However, this same motion of the member 214 through the operation of slot 210 and pin 208 causes rotation of the D-rod 178. Rotation of the D-rod 178 co-acting with the arm 174 allows the stylus 12 to move down into the plane of the record. This movement of the arm 174 also, through the mechanism previously described, causes the movable jaws 50 to engage the threaded rod 48 thereby providing movement of the carriage 18 and the stylus housing assembly 16 during signal playback. When the member 214 arrives at the position as shown in FIG. 1, the finger 234 causes the contacts of switch 242 to again be disposed in an open condition, as shown in FIG. 10. The opening of the switch 242 unlatches the transistor stages $Q_3$ and $Q_4$ and removes power from the relay 294, thereby stopping the DC motor 34.

The mechanism of the player system is now in the signal playback mode of operation. In this mode, termination of playback can be achieved by willfully rejecting the playback, through manipulation of the lever 22 which actuates the start-reject switch 36. Playback can also be terminated when there is no longer video information coming from the record by provision of a signal at terminal 300 by the playback circuitry. When the switch 36 is activated, ground is coupled through the resistor 276 to the base of the transistor stage $Q_1$. Or as indicated, alternatively a positive voltage such as +15 volts DC is applied at the input 300 through a capacitor 302 and resistor 304 to the base of the transistor stage $Q_1$. In either case, the positive going transition causes the transistor $Q_1$ to conduct. As previously described, the transistor stage $Q_2$ conducts, the relay 278 is energized and the circuitry of the transistor stages $Q_1$ and $Q_2$ is latched up through the limit switch 240. The bracket 214 of change assembly 30 is thus driven from the position shown in FIG. 1 to that of FIG. 2. During this motion, the gearwheel 52 is again engaged with the turntable shaft 28. This motion also causes rotation of the D-rod 178 which, through the arm 174, lifts the stylus 12 above the record and disengages the jaws 50 from the threaded rod 48.

Thus the player mechanism has been returned to the cycling drive mode from the playback mode. Since the gearwheel 52 at all times remains coupled to the carriage 18 by means of the pin 54, there is no lost motion of the stylus housing assembly 16, which continues its motion towards the center of the record 4 and then back to its off or rest position, as shown in FIG. 1.

In the meantime, as the bracket 214 arrives at its position, as shown in FIG. 2, the limit switch 240 is opened by the finger 232. The opening of the switch 240 unlatches the circuitry of the transistor stages $Q_1$,$Q_2$, and de-energizes relay 278, which stops the DC drive motor 34, leaving the change assembly 30 in the position shown in FIG. 2.

As the playback housing assembly 16 completes its cycle and arrives at a point off the record 4, as shown in FIG. 1, the cam surface 56 carried by the gearwheel 52 is disposed back at its initial position. Upon the arrival of the cammed surface 56 at this position, the follower member 90, which is coupled to the on-off lever assembly 24, causes the contact arms 264 and 266 of the power switch 26 to be disposed in the open condition, as shown in FIG. 10. Power to the playback system remains on, however, through the contact 268 of limit switch 242. The actuation of the contact 266 of the power switch 26 causes the base of the transistor stage $Q_3$ to be coupled through resistor 306 and capacitor 308 to ground 310. The transistor stage $Q_3$ is thus turned on, which turns on the transistor stage $Q_4$, latching up the transistor $Q_3$ and $Q_4$ circuitry as well as energizing the relay 294. The energization of relay 294 causes power to be applied to the DC motor 34 which drives the bracket 214 of the change assembly 30 back to its position as shown in FIG. 1. In so doing, the cycle drive of the gearwheel 52 is interrupted, leaving the stylus housing at its rest position off the record 4.

When the bracket 214 arrives at its position as shown in FIG. 1, the limit switch 242 is opened by the finger 234. This unlatches the circuitry of transistor stages $Q_3$ and $Q_4$, removes power from the relay 294 stopping the DC motor 34, and the contact 268 of limit switch 242 is also opened, as shown in FIG. 10. Since the contact 268 of switch 242 was the only means keeping AC power applied to the entire system, its opening shuts off the entire system, thereby completing an entire operating cycle of the system.

As previously indicated, it is desirable to operate the playback system with the lid 60 of the enclosure 58 in a closed position. To facilitate the operator in determining the positioning of the playback stylus 12 on the record 4 with the lid 60 closed, an indicator arrangement is provided. The indicator comprises an arm 312 which is secured at one end to the carriage 18 for movement therewith. The other end of arm 312 carries a pointer 314 arranged to move along a calibrated gradical 316 in a panel 318 on the front of the playback system enclosure 58. As shown herein, the pointer may comprise an illuminated bulb whose light is visible through a translucent portion 320 of the panel 318 which carries the gradical 316.

What is claimed is:

1. In a disc record playback system including a rotatably driven turntable, apparatus for controlling cooperation of a playback stylus with a turntable-supported disc record comprising, in combination:

a stylus support housing;

an arm carrying said stylus at one end thereof;

a stylus arm pivot for coupling an end of said arm, remote from said one end, to said stylus support housing; said pivot permitting both lateral and vertical motions of said stylus relative to said stylus support housing;

said stylus support housing being subject to translatory motion to provide a translation of said stylus arm pivot permitting travel of said stylus substantially radially of said record;

stylus control means for providing vertical movement of said stylus relative to said housing between a first depressed position permitting stylus engagement with a turntable-supported record and a second elevated position precluding stylus engagement with a turntable-supported record;

first drive means coupled to said stylus support housing and selectively responsive to rotation of said turntable for moving said stylus support housing between a standby position and a playback position;

said stylus being in vertical registry with a region of said turntable when said stylus support housing is in a playback position, and out of vertical registry with said turntable when said stylus support housing is in said standby position;

second drive means, independent of stylus-record engagement, coupled to said stylus support housing and selectively responsive to rotations of said turntable for moving said stylus support housing during playback of said record; and selective drive control means intercoupled with said first and second drive means and said stylus control means for selectively energizing said first drive means with said stylus disposed in said elevated position and for selectively energizing said second drive means while concomitantly disposing said stylus in said depressed position.

2. The invention according to claim 1 including manually operable further control means; means, including lever means, intercoupling said further control means with said second drive means and said stylus control means; said further control means in one condition thereof being operative through said lever means to disable said second drive means and to dispose said stylus in said elevated position, thereby discontinuing record playback; said further control means during said first condition thereof being effective in holding the attained radial position of said stylus, and said stylus support housing, with respect to said turntable; and said further control means in a second condition thereof being operative to return said stylus to said depressed position and to enable said second drive means, thereby resuming record playback from a point of discontinuance.

3. The invention according to claim 1, wherein said stylus control means includes a member mounted on said stylus support housing for movement with respect to said housing between a first position in engagement with said arm and a further position spaced from said arm, lever means coupled to said member for controlling its position, and means responsive to operation of said selective drive control means to control said lever means.

4. The invention according to claim 1 wherein said first drive means includes an annular rotatable gear-like member, means coupling said gear member to said stylus housing for movement thereof in response to rotation of said gear member, first motion coupling means movably mounted to provide in a first condition motion coupling from said turntable to said gear member, said second drive means including worm gear means rotatably coupled to said turntable, second motion coupling means secured to said stylus housing and movable to provide in a first condition motion coupling from said worm gear means to said housing, further means movably mounted to be disposed in first and second positions with respect to said first and second drive means, first means carried by said further means to dispose said first motion coupling means in said first condition when said further means is in said first position, additional means coupling said further means with said second motion coupling means to dispose said second motion coupling means in said first condition when said further means is in said second position, and means including a further motive source for positioning said further means to alternatively energize said first and second drive means.

5. The invention according to claim 1, wherein said first drive means includes a rotatable member including means for correlating the position of said rotatable member with said stylus support housing, said rotatable member having in a major surface thereof means providing a first electrical contact which is variably spaced, along a spiral, at different radial positions with respect to the center of rotation of said rotatable member, second electrical contact means, means mounting said second electrical contact means for cooperation with said rotatable member surface independent of the position of said stylus support housing, said means mounting said second electrical contact means effective to provide a predetermined initial spacing along said rotatable member surface between said first and second electrical contact means, and means including circuit means responsive to mutual engagement of said electrical contact means, in response to rotation of said rotatable member, to provide control of said selective drive control means.

6. The invention according to claim 1, wherein said second drive means including a threaded drive shaft rotatably driven from said turntable, a pair of aligned members disposed at opposite sides of said shaft, said members having threaded portions adapted to be translated when engaged with said shaft, means securing said members to said stylus support housing for slidable movement toward and away from said shaft, means biasing said members into engagement with said shaft, and means engageable with said members to dispose said threaded portions in spaced relation with said shaft.

7. The invention according to claim 6, wherein said members include at least one slot therein having a constricted portion, a pin disposed in said slot, and means for moving said pin along said slot to thereby control engagement of said members with said shaft.

8. A system for playing back information from a major surface of a disc record, comprising:

a stylus support housing;

a playback stylus within said stylus support housing and movable with respect to said stylus support housing toward and away from said record surface and in lateral directions parallel to said record surface;

means mounting said stylus support housing for translatory movement only in directions substantially parallel to said record surface;

drive means, independent of stylus-record engagement, for effecting said translatory movement of said stylus support housing; said drive means being effective in a first mode in moving said stylus support housing between a standby position and a playback position, and in a second mode in providing travel of said stylus radially across said record surface; said stylus being out of registry with said record surface when said stylus support housing is in said standby position; and said stylus being in registry with a portion of said record surface when said stylus support housing is in said playback position; and selective drive control means for selectively energizing said drive means to operate in a selected one of said modes.

9. The invention according to claim 8, including means within said housing mounted for movement between first and second positions, said means in said first position disposing said stylus in substantially co-planar relation to said record surface and in said second position disposing said stylus in spaced relation with the plane of said record surface, and means intercoupling said stylus positioning means and said drive means to control the position of said stylus in accordance with the position of said housing relative to said record surface.

10. The invention according to claim 8, including a rotatably driven turntable, a threaded drive shaft coupled for rotation by said turntable, a pair of members having threaded portions encircling said shaft, means coupling said members to said housing for relative movement toward and away from each other and said shaft, means coupled to said drive means for controlling the engagement of said members with said shaft in accordance with the position of said stylus over said record.

11. The invention according to claim 8, wherein said playback system includes a rotatably driven turntable having a driving shaft secured thereto, said drive means including first and second motion coupling means each movably mounted to provide in a first condition motion coupling from said turntable shaft to said stylus housing, said drive energizing means including further means having portions movable into engagement with said first and second motion coupling means to alternatively dispose said first and second coupling means in their first condition, and means coupled to said further means and responsive to a control signal for positioning the movable portions of said further means.

12. The invention according to claim 8, wherein said drive means includes a rotatable member including means for correlating the position of said rotatable member with said stylus support housing, and means including said rotatable member for providing a positioned control of said stylus with respect to said record, and further including:

first electrical contact means mounted on and carried by said rotatable member providing a first electrical contact which is variable spaced along a spiral, at different radial positions, with respect to the center of rotation of said rotatable member, second electrical contact means, means mounting said second electrical contact means in cooperative relation with said rotatable member surface independent of the position of said stylus support housing, said second electrical contact mounting means being effective for providing a given initial spacing along said rotatable member surface between said first and second electrical contact means, and means including circuit means responsive to the mutual engagement of said first and second electrical contacts, in response to rotation of said rotatable member, for providing a positioning control of said stylus with respect to said record.

* * * * *